United States Patent
Yano et al.

[11] Patent Number: 6,007,946
[45] Date of Patent: Dec. 28, 1999

[54] NON-SINTERED NICKEL ELECTRODE FOR ALKALINE STORAGE BATTERY, ALKALINE STORAGE BATTERY INCLUDING THE SAME, AND METHOD FOR PRODUCTION OF NON-SINTERED NICKEL ELECTRODE FOR ALKALINE STORAGE BATTERY

[75] Inventors: Mutsumi Yano; Mitsuzo Nogami; Katsuhiko Shinyama, all of Osaka; Kousuke Satoguchi, Tokushima; Mitsunori Tokuda, Osaka; Ikuo Yonezu, Osaka; Koji Nishio, Osaka; Masao Inoue, Tokushima; Shin Fujitani, Osaka, all of Japan

[73] Assignee: Sanyo Electric Co., Ltd., Osaka, Japan

[21] Appl. No.: 08/881,146

[22] Filed: Jun. 24, 1997

[30] Foreign Application Priority Data

Jun. 26, 1996 [JP] Japan .................................. 8-186586
Feb. 21, 1997 [JP] Japan .................................. 9-054016

[51] Int. Cl.$^6$ .............................. H01M 4/32; H01M 4/24; H01M 4/26
[52] U.S. Cl. .................. 429/223; 429/206; 429/218.1
[58] Field of Search .................................. 429/223, 101, 429/206, 59

[56] References Cited

U.S. PATENT DOCUMENTS 5,466,543  11/1995  Ikoma et al. .................. 429/59
5,523,182  6/1996   Ovshinsky et al. .......... 429/223
5,672,447  9/1997   Yamawaki et al. ........... 429/223

FOREIGN PATENT DOCUMENTS 62-234867A  10/1987  Japan .
3A-078965   4/1991   Japan .
5-028992A   2/1993   Japan .
8-329937A   12/1996  Japan .

*Primary Examiner*—Maria Nuzzolillo
*Assistant Examiner*—Angela J. Martin
*Attorney, Agent, or Firm*—Birch, Stewart, Kolasch & Birch, LLP

[57] ABSTRACT

In the non-sintered nickel electrode for an alkaline storage battery according to the invention, a yttrium metal powder and/or a yttrium compound powder has been added to a particulate active material comprising composite particles each consisting of a nickel hydroxide core and a sodium-doped cobalt compound shell. Because the yttrium metal powder and/or yttrium compound powder inhibits the diffusion of cobalt into the nickel hydroxide core, the non-sintered nickel electrode of the invention exhibits a high utilization efficiency not only in an initial phase of charge-discharge cycling but over a long time of use. Moreover, because the yttrium metal powder and/or yttrium compound powder enhances the oxygen overpotential, the non-sintered nickel electrode for an alkaline storage battery according to the invention shows very satisfactory charge characteristics particularly at high temperatures.

31 Claims, 6 Drawing Sheets

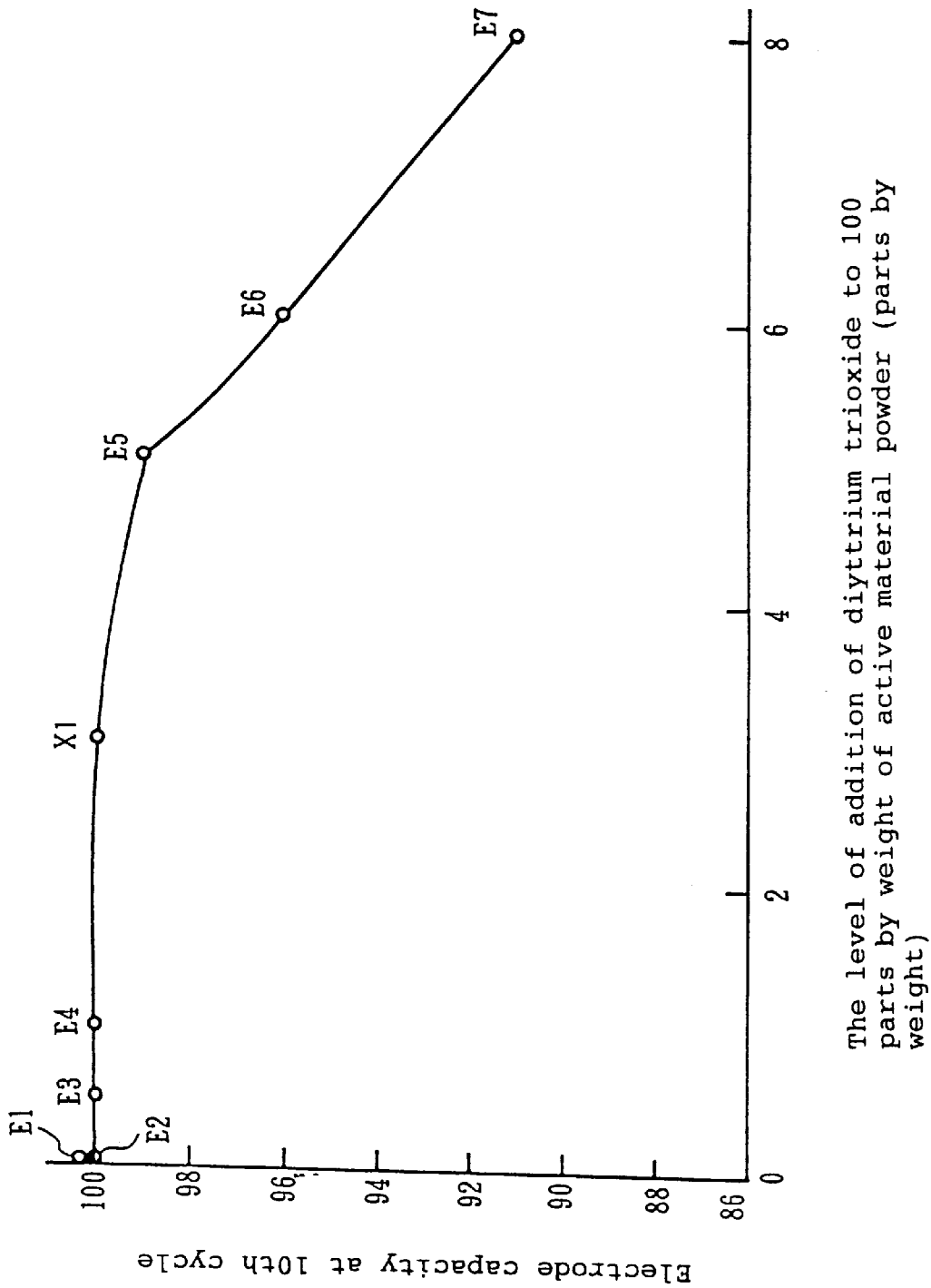

NON-SINTERED NICKEL ELECTRODE FOR ALKALINE STORAGE BATTERY, ALKALINE STORAGE BATTERY INCLUDING THE SAME, AND METHOD FOR PRODUCTION OF NON-SINTERED NICKEL ELECTRODE FOR ALKALINE STORAGE BATTERY

FIELD OF THE INVENTION

The present invention relates to a non-sintered nickel electrode for an alkaline storage battery and to an alkaline storage battery including said electrode.

BACKGROUND OF THE INVENTION

The application claims the priorities of Japanese Patent Applications No. 8-186586 filed on Jun. 26, 1996 and No. 9-54016 filed on Feb. 21, 1997.

As the positive electrode for certain secondary batteries such as a nickel-hydrogen storage battery or a nickel-cadmium storage battery, a sintered nickel electrode fabricated by sintering a nickel powder onto a perforated steel substrate or the like and impregnating the resulting plaque with an active material (nickel hydroxide) is well known.

To insure an increased impregnation with the active material for a sintered nickel electrode, it is necessary to employ a sintered substrate or plaque of increased porosity: However, since the inter-particle bond of sintered nickel is weak, increasing the porosity of the substrate increases the tendency for the nickel particles to be dislodged from the plaque. For practical purposes, therefore, the porosity of the sintered substrate cannot be increased beyond 80%, with the result that the sintered nickel electrode has the drawback that the impregnation amount of active material is limited. In addition, since the pore size of the sintered nickel is generally as small as 10 $\mu$m or less, impregnation of the plaque with the active material requires the time-consuming dip method which involves several immersion cycles.

For the above reasons, a non-sintered nickel electrode has been proposed of late. The non-sintered nickel electrode is fabricated by impregnating a high-porosity substrate (such as a foamed metal plated with an alkali-resistant metal) with a paste prepared by kneading an active material (nickel hydroxide) and a binder (such as an aqueous solution of methylcellulose) together. Since a high-porosity substrate (with a porosity of 95% or greater) can be used for the non-sintered nickel electrode, not only the impregnation amount of active material can be increased but the impregnation procedure is facilitated.

However, when a high-porosity substrate is used for increasing the impregnation amount of active material in a non-sintered nickel electrode, the capacity of the substrate as a current collector deteriorates so that the utilization of active material, i.e. utilization efficiency, is decreased. Moreover, the non-sintered nickel electrode has the drawback that the utilization efficiency at high temperatures is low. Thus, because of its low oxygen over-potential, the charging electric energy in charging is consumed not only in the oxidation reaction from nickel hydroxide to nickel oxyhydroxide but also in the oxygen generating reaction associated with decomposition of water (water in alkaline electrolyte).

Therefore, in order to increase the utilization of active material, i.e. utilization efficiency, in a non-sintered nickel electrode, it has been proposed to use a powdery active material comprising composite particles each consisting of a nickel hydroxide core and a cobalt hydroxide [$\beta$-Co(OH)$_2$ or $\alpha$-Co(OH)$_2$] shell or a powder comprising composite particles each consisting of a nickel hydroxide core and a cobalt oxyhydroxide shell (JP Kokai S62-234867 and JP Kokai H3-78965). Moreover, for assuring a high utilization efficiency over a broad temperature range, it has been proposed to add cobalt metal, cobalt hydroxide, and a yttrium compound to nickel hydroxide powder (JP Kokai H5-28992).

However, the investigations made by the inventors of the present invention revealed that those prior art methods are hardly capable of providing a non-sintered nickel electrode expressing a high utilization efficiency over a large number of charge-discharge cycles.

Furthermore, for enhancing the oxygen overpotential of a non-sintered nickel electrode, a suggestion has been made to add to the active material nickel oxide a specified element (at least one element selected from the group consisting of Ca, Sr, Ba, Cu, Ag, and Y) in the form of a powder of its compound (e.g. Ca(OH)$_2$, CaO, CaS, CaF$_2$, Y$_2$(CO$_3$)$_3$, Y$_2$O$_3$, etc.) having a mean particle diameter not greater than one-half of the mean particle diameter of said nickel oxide (JP Kokai H8-329937). The object of this technology is to increase the oxygen overpotential of the nickel electrode by adding a compound of such specified element to nickel oxide to thereby suppress the evolution of oxygen in charging.

However, the experimental review by the inventors of the present invention revealed that the above non-sintered nickel electrode also has the following aspects to be improved. Thus, said compound of specified element (e.g. Ca etc.) increases the oxygen overpotential in fact but is little effective in enhancing electrical conductivity. Thus, in order that the utilization efficiency may be increased, it is necessary to augment not only oxygen overpotential but also electrical conductivity. It is for this reason that in a working example of JP Kokai H8-329937 a cobalt powder and a cobalt hydroxide powder as well as a calcium sulfide (CaS) powder are added to a nickel hydroxide powder. However, if those three components are simultaneously added to nickel hydroxide, cobalt hydroxide cannot be precipitated in the area where CaS has already been adsorbed (the precipitated cobalt hydroxide is oxidized in the charging process to $\beta$-CoOOH which renders the surface of particulate nickel hydroxide electrically conductive), with the result that a uniformly conductive matrix cannot be formed on the powder surface.

OBJECT AND SUMMARY OF THE INVENTION

Therefore, the present invention has for its primary object to provide a non-sintered nickel electrode capable of expressing a high utilization efficiency not only in an initial phase of charge-discharge cycles but also over a long time and an alkaline storage battery including the same electrode. It is another object of the present invention to provide a non-sintered nickel electrode capable of expressing a high active material utilization efficiency not only in an initial phase of charge-discharge cycles but also over a long time and having very satisfactory charging characteristics, particularly at high temperatures, and an alkaline storage battery including said electrode.

In the non-sintered nickel electrode for an alkaline storage battery which is provided by the present invention (the electrode will hereinafter be referred to sometimes as the electrode of the invention), a yttrium metal powder and/or a yttrium compound powder has been added to a finely divided active material comprising composite particles each consisting of a nickel hydroxide core and a sodium-doped cobalt compound shell.

BRIEF DESCRIPTION OF THE DRAWINGS

FIG. 6 is a diagrammatic representation of the relationship of the level of addition of powdery diyttrium trioxide with the electrode capacity at the 10th cycle.

DETAILED DESCRIPTION OF THE INVENTION

Figure 1:
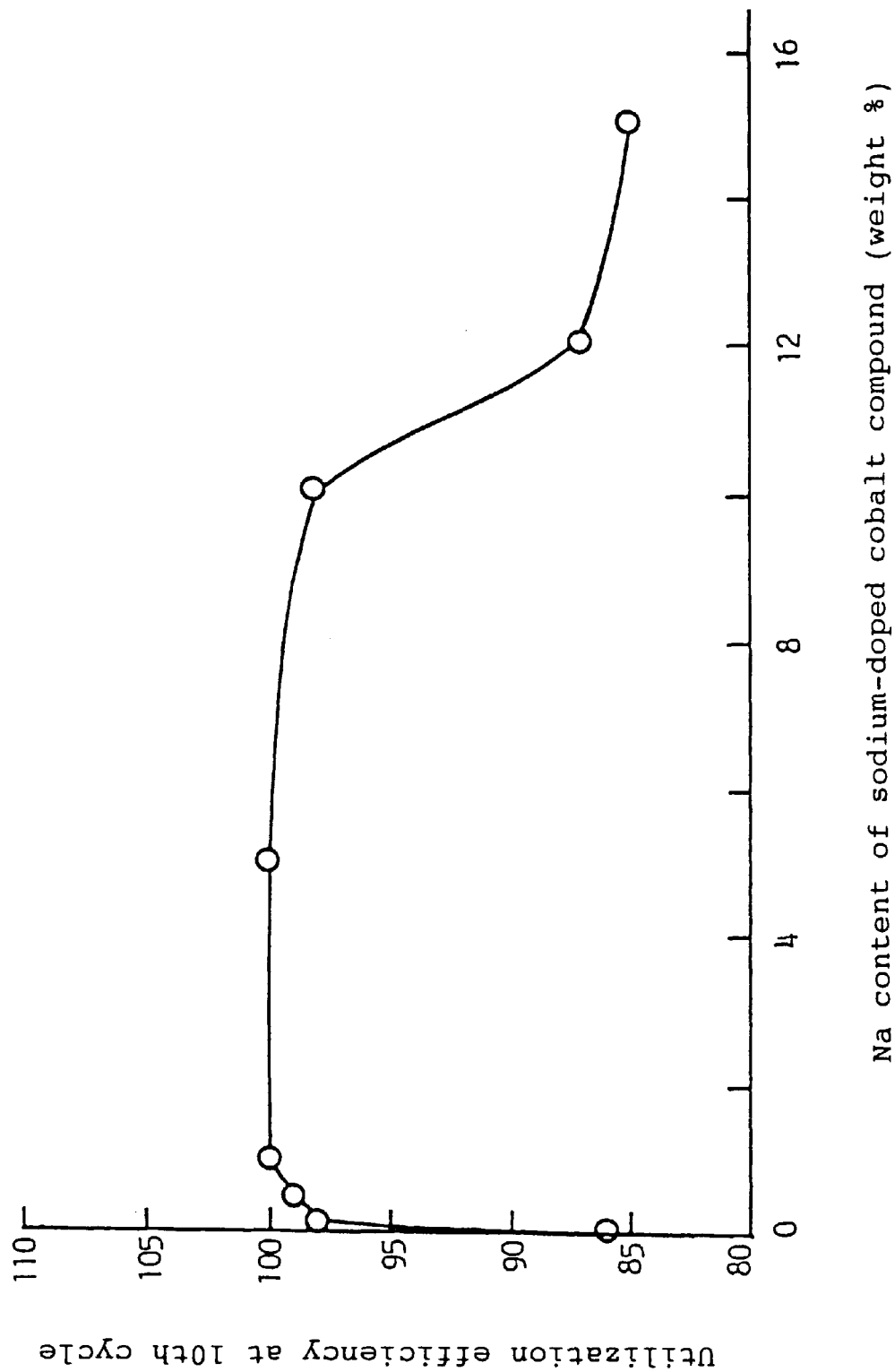
FIG. 1 is a diagrammatic representation of the relationship of the sodium content of the sodium-doped cobalt compound with the utilization efficiency at the 10th cycle.

The powdery active material for the electrode of the invention comprises composite particles each consisting of a nickel hydroxide core and a sodium-doped cobalt compound shell. By the formation of such a sodium-containing shell, the surface conductivity of the powdery active material is remarkably enhanced. The term "powdery nickel hydroxide" as used herein means not only a powder made up exclusively of nickel hydroxide but also a solid solution powder available upon dissolution of at least one element selected from the group consisting of cobalt, zinc, cadmium, calcium, manganese, magnesium, bismuth, aluminum, and yttrium in nickel hydroxide. By dissolving one or more of said elements in nickel hydroxide to provide a solid solution, the swelling of the non-sintered nickel electrode in the charge process can be inhibited.

The shell or surface layer comprised of a sodium-doped cobalt compound can be formed by adding an aqueous solution of sodium hydroxide to a powder comprising composite particles each consisting of a nickel hydroxide core and, as formed on its surface, a cobalt metal layer or a cobalt compound layer such as a layer of cobalt hydroxide, cobalt monoxide, or cobalt oxyhydroxide and subjecting the mixture to heat treatment in the presence of oxygen.

A typical procedure for forming a cobalt hydroxide shell layer on the surface of a particulate nickel hydroxide core comprises adding said powdery nickel hydroxide to an aqueous solution of a salt of cobalt (such as an aqueous solution of cobalt sulfate), adding an alkaline aqueous solution (such as an aqueous solution of sodium hydroxide) dropwise thereto with stirring to adjust the system to about pH 11, and further stirring the system for a predetermined time while an alkaline aqueous solution is added dropwise when the pH has dropped below said level so as to maintain the pH of the system at about 11 at all times to thereby cause cobalt hydroxide to be precipitated on the surface of the nickel hydroxide core. The cobalt hydroxide surface layer can also be formed by the mechanical charging method which comprises dry-mixing powdery nickel hydroxide with powdery cobalt hydroxide in an inert gas using a compression grinding mill. If, in the above mechanical charging method, powdery cobalt monoxide and powdery cobalt metal are used in lieu of powdery cobalt hydroxide, the cobalt monoxide layer and the cobalt metal layer are respectively formed. The cobalt oxyhydroxide layer can be formed typically by forming a cobalt hydroxide layer on the surface of powdery nickel hydroxide and oxidizing the surface cobalt hydroxide layer with an aqueous solution of hydrogen peroxide preheated to about 40° C.

The shell layer comprised of a sodium-doped cobalt compound can be formed by adding an aqueous solution of sodium hydroxide to a powder comprising composite particles each having a cobalt metal or cobalt compound surface layer and subjecting the mixture to heat treatment in the presence of oxygen. The mere addition of an aqueous solution of sodium hydroxide does not provide a shell layer of a sodium-doped cobalt compound and the heat treatment in the presence of oxygen is essential. The preferred temperature for this heat treatment is 50–200° C. When the heat treatment is carried out at a temperature below 50° C., $CoHO_2$ of low electrical conductivity is precipitated in a large amount, while the heat treatment at a temperature over 200° C. leads to precipitation of a large amount of tricobalt tetraoxide ($Co_3O_4$) which is also of low electrical conductivity. When the cobalt layer is a cobalt oxyhydroxide layer, no precipitation of $CoHO_2$ will take place even if the heat treatment is carried out at a low temperature below 50° C. but the sodium doping will not be easily accomplished. The duration of heat treatment depends on the quantity and concentration of the aqueous solution of sodium hydroxide used and the temperature of heat treatment, among other factors, but is generally 0.5–10 hours.

The sodium-doped cobalt compound that can be used for the formation of the shell layer includes sodium-doped cobalt hydroxide, sodium-doped cobalt oxyhydroxide, and a mixture thereof. The chemical structure of such a sodium-doped cobalt compound is not sufficiently clear even to the inventors of the present invention but in view of its extremely high electrical conductivity, it is suspected to be not a simple mixture of the cobalt compound with sodium but a compound having a special crystal structure such that sodium has been incorporated in the crystal of the cobalt compound.

The preferred proportion of the sodium-doped cobalt compound shell with respect to nickel hydroxide is 1–10 weight % as cobalt. If the proportion of the cobalt equivalent of the shell layer is less than 1 weight %, no sufficient improvement in electrical conductivity will be realized so that it is difficult to provide a non-sintered nickel electrode with a high utilization efficiency. On the other hand, if the proportion of cobalt exceeds 10 weight %, the packed density of active material will be lowered to reduce the specific capacity of the electrode. The preferred sodium content of the shell layer is 0.1–10 weight %. If the sodium content deviates from this range, the electrical conductivity of the shell will decrease to make it difficult to provide a non-sintered nickel electrode with a sufficiently high utilization efficiency.

In the electrode of the invention, a yttrium metal powder and/or a yttrium compound powder has been added to the powdery active material. Addition of a yttrium metal powder and/or a yttrium compound powder suppresses diffusion of cobalt from the shell layer to the nickel hydroxide core of the particle and, at the same time, enhances the oxygen overpotential of the non-sintered nickel electrode. As to the yttrium compound powder, two or more kinds of compounds can be used where necessary. The yttrium compound includes diyttrium trioxide, yttrium carbonate, and yttrium fluoride. The preferred proportion of powdery yttrium metal and/or powdery yttrium compound relative to 100 parts by weight of powdery active electrode material is 0.05–5 parts by weight. If the proportion of said powdery yttrium metal and/or powdery yttrium compound is less than 0.05 part by weight, the diffusion of cobalt from the shell layer into the nickel hydroxide core of the particle will not be effectively inhibited. The result will be a failure to provide a non-sintered nickel electrode capable of exhibiting a sufficiently high utilization efficiency over a long time of charge-discharge cycling and to effectively increase the oxygen overpotential, so that a non-sintered nickel electrode with satisfactory charging characteristics, particularly at high temperatures, can hardly be provided. On the other hand, if said proportion is larger than 5 parts by weight, the packed density of nickel hydroxide active material is decreased to sacrifice the specific capacity of the electrode.

To provide a non-sintered nickel electrode with satisfactory charging characteristics, particularly at high temperatures, the mean particle diameter of said powdery yttrium metal and powdery yttrium compound is preferably controlled within the range of 0.5–20 μm. If the mean particle diameter is less than 0.5 μm, secondary coagulation will take place. On the other hand, if it exceeds 20 μm, a uniform deposition on the surface of the active material particle can hardly be expected. As a consequence, the oxygen overpotential cannot be effectively increased in either case.

Since a particulate material comprising composite particles each consisting of a nickel hydroxide core and a sodium-doped cobalt compound shell designed to increase the surface conductivity of the particle is used as the active material as described above, the electrode of the invention features a high utilization efficiency in an initial phase of charge-discharge cycling. Moreover, since the electrode of the invention includes a yttrium metal powder and/or a yttrium compound powder as added to the above particulate active material, the diffusion of cobalt from the shell into the nickel hydroxide core in cycling is suppressed and, in addition, the oxygen overpotential is so high that the charging electric energy is effectively consumed in the charge reaction, particularly at high temperatures. Therefore, the electrode of the invention insures a high utilization efficiency not only in an initial phase of cycling but over a long time of operation and, at the same time, exhibits very satisfactory charging characteristics, particularly at high temperatures.

For reference, mere blending of a sodium-doped cobalt compound powder and a metallic yttrium powder and/or a yttrium compound powder with particulate nickel hydroxide does not provide a non-sintered nickel electrode with satisfactory characteristics comparable to those of the electrode of the invention. Thus, if a yttrium metal powder and/or a yttrium compound powder is added without prior formation of a sodium-doped cobalt compound shell layer on the nickel hydroxide core, the electrical conductivity-imparting effect of the sodium-doped cobalt compound on the surface of the nickel hydroxide particle is compromised by the yttrium metal and/or yttrium compound.

The non-sintered nickel electrode for an alkaline storage battery to which the present invention can be applied with advantage includes a paste type nickel electrode which is generally fabricated by coating an electrically conductive core element with a paste containing the active material and drying it, among others. The electrically conductive substrate element that can be used includes but is not limited to a foamed nickel element, a felt-like porous element of metal fiber, and a perforated metal. In addition, the present invention can be applied with advantage to the tubular nickel electrode comprising a tubular metallic conductor packed with an active material, a pocket type nickel electrode comprising a pocket-shaped metallic conductor packed with an active material, and a nickel electrode for a button battery which is fabricated by compression-molding an active material and a screen-mesh metal conductor as a unit. The alkaline secondary battery to which the present invention can be applied with advantage includes the nickel-hydrogen secondary battery (negative electrode: hydrogen-absorbing alloy electrode), nickel-cadmium secondary battery (negative electrode: cadmium electrode), and nickel-zinc secondary battery (negative electrode: zinc electrode), among other kinds of batteries.

The following examples are intended to describe the present invention in further detail and should by no means be construed as defining the scope of the invention. Thus, many changes and modifications can be made by those skilled in the art without departing from the spirit of the invention.

Preliminary Experiment 1

Cobalt hydroxide was mixed with a 5 weight % (wt. %), 10 wt. %, 15 wt. %, 25 wt. %, 35 wt. %, 40 wt. %, 45 wt. %, or 50 wt. % aqueous solution of sodium hydroxide in a weight ratio of 1:10 and the mixture was heat-treated at 85° C. for 8 hours. This product was rinsed with water and dried at 60° C. to provide a sodium-doped cobalt compound. The sodium content of the thus-obtained sodium-doped cobalt compound as determined by atomic absorption analysis was, in the order mentioned for the concentration of sodium hydroxide solution, 0.05 wt. %, 0.1 wt. %, 0.5 wt. %, 1 wt. %, 5 wt. %, 10 wt. %, 12 wt. %, and 15 wt. %, respectively.

Preliminary Experiment 2

Cobalt hydroxide was mixed with a 25 wt. % aqueous solution of sodium hydroxide in a weight ratio of 1:10 and the mixture was heat-treated at 45° C., 50° C., 100° C., 150° C., 200° C., 220° C., or 250° C. for 8 hours, then rinsed with water, and dried at 60° C. to provide a sodium-doped cobalt compound. The sodium content of the thus-obtained sodium-doped cobalt compound as determined by atomic absorption analysis was 0.05 wt. %, 1 wt. %, 1 wt. %, 1 wt. %, 1 wt. %, 0.05 wt. %, and 0.02 wt. %, respectively.

EXAMPLE 1

Step 1: To 1 liter of an aqueous solution prepared by dissolving 13.1 g of cobalt sulfate in water was added 100 g of nickel hydroxide powder and after the mixture was adjusted to pH 11 with 1 M sodium hydroxide/$H_2O$ solution under constant stirring, the reaction was carried out with stirring for 1 hour. When the pH had dropped somewhat, 1 M sodium hydroxide solution was further added dropwise to maintain the mixture at pH 11. pH monitoring was carried out using a glass electrode (pH meter) equipped with an automatic temperature compensator. The precipitate was collected by filtration, rinsed with water, and dried in vacuo to provide a powdery product comprising composite particles each consisting of a nickel hydroxide core and a cobalt hydroxide shell layer.

Step 2: The above powdery product was mixed with a 25% aqueous solution of sodium hydroxide in a weight ratio of 1:10 and the mixture was heat-treated at 85° C. for 8 hours, then rinsed with water, and dried at 65° C. to provide a particulate active electrode material comprising composite particles each consisting of a nickel hydroxide core and a sodium-doped cobalt compound shell. The sodium content of the sodium-doped cobalt compound constituting the shell layer is 1 wt. % (the estimated value based on results of Preliminary Experiment 1).

Step 3: A paste was prepared by kneading 100 parts by weight of the above active material powder (mean particle diameter 10 μm), 3 parts by weight of powdery diyttrium trioxide ($Y_2O_3$; mean particle diameter 1 μm), and, as a binder, 20 parts by weight of a 1 wt. % aqueous solution of methylcellulose. The water in the aqueous solution of methylcellulose functions as a dispersion medium for the powdery active material and powdery diyttrium trioxide. This paste was used to impregnate a porous foamed nickel (porosity 95%, mean pore diameter 200 μm) and, after drying, the impregnated foamed nickel was compression-molded to provide a non-sintered nickel electrode (electrode of the invention) a1. The size of this electrode a1 of the invention was 70 mm long×40 mm wide×0.70 mm thick. This size was uniformly adopted for all the non-sintered nickel electrodes fabricated as mentioned hereinafter, too, so as to make the electrode volume constant.

Step 4: The above electrode a1 of the invention (positive electrode), the conventional paste cadmium electrode (negative electrode) having a capacity of 1.5 times the capacity of said positive electrode, a polyamide nonwoven fabric (separator), a 30 wt. % aqueous solution of potassium hydroxide (alkaline electrolyte), a metallic battery case, and a metallic lid were used to fabricate an AA size alkaline storage battery A1 (battery capacity: ca 1000 mAh). The size of the cadmium electrode was 85 mm long×40 mm wide× 0.35 mm thick.

EXAMPLE 2

Except that 1 part by weight of yttrium metal was used in lieu of 3 parts by weight of diyttrium trioxide in Step 3, the procedure of Example 1 was otherwise repeated to fabricate a non-sintered nickel electrode (electrode of the invention) a2 and an alkaline storage battery A2.

EXAMPLE 3

Except that 1 part by weight of yttrium carbonate was used in lieu of 3 parts by weight of diyttrium trioxide in Step 3, the procedure of Example 1 was otherwise repeated to fabricate a non-sintered nickel electrode (electrode of the invention) a3 and an alkaline storage battery A3.

EXAMPLE 4

Except that 1 part by weight of yttrium fluoride was used in lieu of 3 parts by weight of diyttrium trioxide in Step 3, the procedure of Example 1 was otherwise repeated to fabricate a non-sintered nickel electrode (electrode of the invention) a4 and an alkaline storage battery A4.

COMPARATIVE EXAMPLE 1

Except that the finely divided powder comprising composite particles each consisting of a nickel hydroxide core and a cobalt hydroxide shell as obtained in Step 1 of Example 1 was used as the powdery active material, the procedures of Steps 3 and 4 of Example 1 were otherwise repeated to provide a comparative electrode b1 and an alkaline storage battery B1.

COMPARATIVE EXAMPLE 2

The finely divided powder comprising composite particles each consisting of a nickel hydroxide core and a cobalt hydroxide shell as obtained in Step 1 of Example 1 was reacted with a 30 wt. % aqueous solution of hydrogen peroxide preheated at 40° C. to oxidize the cobalt hydroxide to cobalt oxyhydroxide (β-CoOOH). Except that the thus-obtained powder comprising composite particles each consisting of a nickel hydroxide core and a cobalt oxyhydroxide shell was used as the powdery active material, the procedures of Steps 3 and 4 of Example 1 were otherwise repeated to provide a comparative electrode b2 and an alkaline storage battery B2.

COMPARATIVE EXAMPLE 3

Except that diyttrium trioxide was not added, the procedure of Example 1 was otherwise repeated to provide a comparative electrode b3 and an alkaline storage battery B3.

COMPARATIVE EXAMPLE 4

Except that diyttrium trioxide was not added, the procedure of Comparative Example 1 was otherwise repeated to provide a comparative electrode b4 and an alkaline storage battery B4. This battery was assembled in accordance with the method disclosed in JP Kokai S62-234867.

COMPARATIVE EXAMPLE 5

Except that diyttrium trioxide was not added, the procedure of Comparative Example 2 was otherwise repeated to provide a comparative electrode b5 and an alkaline storage battery B5. This battery was assembled by the method disclosed in JP Kokai H3-78965.

COMPARATIVE EXAMPLE 6

A paste was prepared by kneading 100 parts by weight of nickel hydroxide, 7 parts by weight of cobalt metal, 5 parts by weight of cobalt hydroxide, 3 parts by weight of diyttrium trioxide (mean particle diameter 1 μm), and as a binder, 20 parts by weight of a 1 wt. % aqueous solution of methylcellulose. This paste was used to impregnate a porous foamed nickel (porosity 95%, mean pore diameter 200 μm) and, after drying, the impregnated foam was compression-molded to fabricate a comparative electrode b6. Then, except that this comparative electrode b6 was used instead of electrode a1, the procedure of Step 4 of Example 1 was repeated to fabricate an alkaline secondary battery B6. This battery was assembled by the method disclosed in JP Kokai H5-28992.

The Active Material Utilization Efficiency of Each Non-Sintered Nickel Electrode Each of the batteries fabricated in Examples 1–4 and Comparative Examples 1–6 was subjected to a cycle test comprising charging at 25° C. and 0.1° C. to 160% and discharging at 25° C. and 1° C. to 1.0 V as one cycle and the active material utilization efficiency values of the non-sintered nickel electrode in each battery at the 10th cycle and 200th cycle were determined. The active material utilization efficiency was calculated by means of the following formula.

Utilization efficiency (%)=[the discharge capacity (mAh) at the 10th or 200th cycle]/[amount of nickel hydroxide (g)×288 (mAh/g)]×100

The results are shown in Table 1. It should be understood that the active material utilization efficiency values shown in Table 1 are relative values with the utilization efficiency of the electrode a1 of the invention being taken as 100.

TABLE 1

| Non-sintered nickel electrode | Utilization efficiency at 10th cycle | Utilization efficiency at 200th cycle |
| --- | --- | --- |
| a1 | 100 | 97 |
| a2 | 100 | 97 |
| a3 | 100 | 96 |
| a4 | 100 | 97 |
| b1 | 96 | 90 |
| b2 | 95 | 90 |
| b3 | 100 | 87 |
| b4 | 96 | 83 |
| b5 | 95 | 83 |
| b6 | 75 | 60 |

As shown in Table 1, the active material utilization efficiency values of the electrodes a1–a4 of the invention at the 10th and 200th cycles were invariably as high as 100 and 97, respectively. The utilization efficiency values of the comparative electrodes b1–b6 at the 10th cycle and 200th cycle were lower than the corresponding values of electrodes a1–a4 of the invention. The utilization efficiency values of comparative electrodes b1 and b2 at the 10th cycle and 200th cycle were somewhat lower than the corresponding values of electrodes a1–a4 of the invention and this is probably because the cobalt compound constituting the shell layer does not contain sodium and, hence, fails to provide for satisfactory electrical conductivity. Comparative electrodes b3–b5 were comparable to electrodes a1–a4 of the invention and comparative electrode b1–b2 in the utilization efficiency at the 10th cycle but their utilization efficiency values at the 200th cycle were considerably lower. This is probably because, in the absence of diyttrium trioxide, the cobalt in the shell layer diffuses into the nickel hydroxide core with the process of the charge-discharge cycle to decrease the electrical conductivity of the active material. The active material utilization efficiency values of comparative electrode b6 at the 10th and 200th cycles were both extremely low and this is probably because the electrical conductivity imparting effect of cobalt metal and cobalt hydroxide powders on the surface of the nickel hydroxide particle was antagonized by the yttrium metal and/or yttrium compound.

Relationship of the Sodium Content of the Sodium-Doped Cobalt Compound With Utilization Efficiency Except that a 5 wt. %, 10 wt. %, 15 wt. %, 35 wt. %, 40 wt. %, 45 wt. %, or 50 wt. % aqueous solution of sodium hydroxide was used, the procedures of Steps 1 and 2 of Example 1 were otherwise repeated to provide a particulate active material comprising composite particles each consisting of a nickel hydroxide core and a sodium-doped cobalt compound shell. Then, except that those active material powders were used, the procedures of Steps 3 and 4 of Example 1 were otherwise repeated to fabricate non-sintered nickel electrodes and alkaline storage batteries. The sodium content of the sodium-doped cobalt compound constituting the shell layer is, in the order mentioned for the concentration of sodium hydroxide used, 0.05 wt. %, 0.1 wt. %, 0.5 wt. %, 5 wt. %, 10 wt. %, 12 wt. %, or 15 wt. % (the estimated values based on results of Preliminary Experiment 1).

Each of the above batteries was subjected to the cycle test under the conditions mentioned hereinbefore and the active material utilization efficiency values of the non-sintered nickel electrodes used in the respective batteries at the 10th charge-discharge cycle were determined. The results are shown in FIG. 1. FIG. 1 is a diagrammatic representation of the relationship of sodium content, which is plotted on the abscissa, with the 10th cycle utilization efficiency, which is plotted on the ordinate. FIG. 1 also shows the active material utilization efficiency of electrode a1 of the invention (sodium content: 1 wt. %) at the 10th cycle and the active material utilization efficiency values plotted on the ordinate are relative values with the utilization efficiency of electrode a1 of the invention being taken as 100.

It is clear from FIG. 1 that for the purpose of providing a non-sintered nickel electrode with a high active material utilization efficiency, the sodium content of the sodium-doped cobalt compound is preferably within the range of 0.1–10 weight %.

Relationship of the Temperature For Heat Treatment With Utilization Efficiency

Except that the heat treatment was carried out at 45° C., 50° C., 100° C., 150° C., 200° C., 220° C., or 250° C., the procedures of Steps 1 and 2 of Example 1 were otherwise repeated to provide a particulate active material comprising composite particles each consisting of a nickel hydroxide core and a sodium-doped cobalt compound shell. Then, using those active material powders, the procedures of Steps 3 and 4 of Example 1 were otherwise repeated to provide non-sintered nickel electrodes and alkaline storage batteries. The sodium content of the sodium-doped cobalt compound constituting the shell layer was, in the order mentioned for the temperature of heat treatment, 0.05 wt. %, 1 wt. %, 1 wt. %, 1 wt. %, 1 wt. %, 0.05 wt. %, or 0.02 wt. % (the estimated values based on results of Preliminary Experiment 2).

Figure 2:
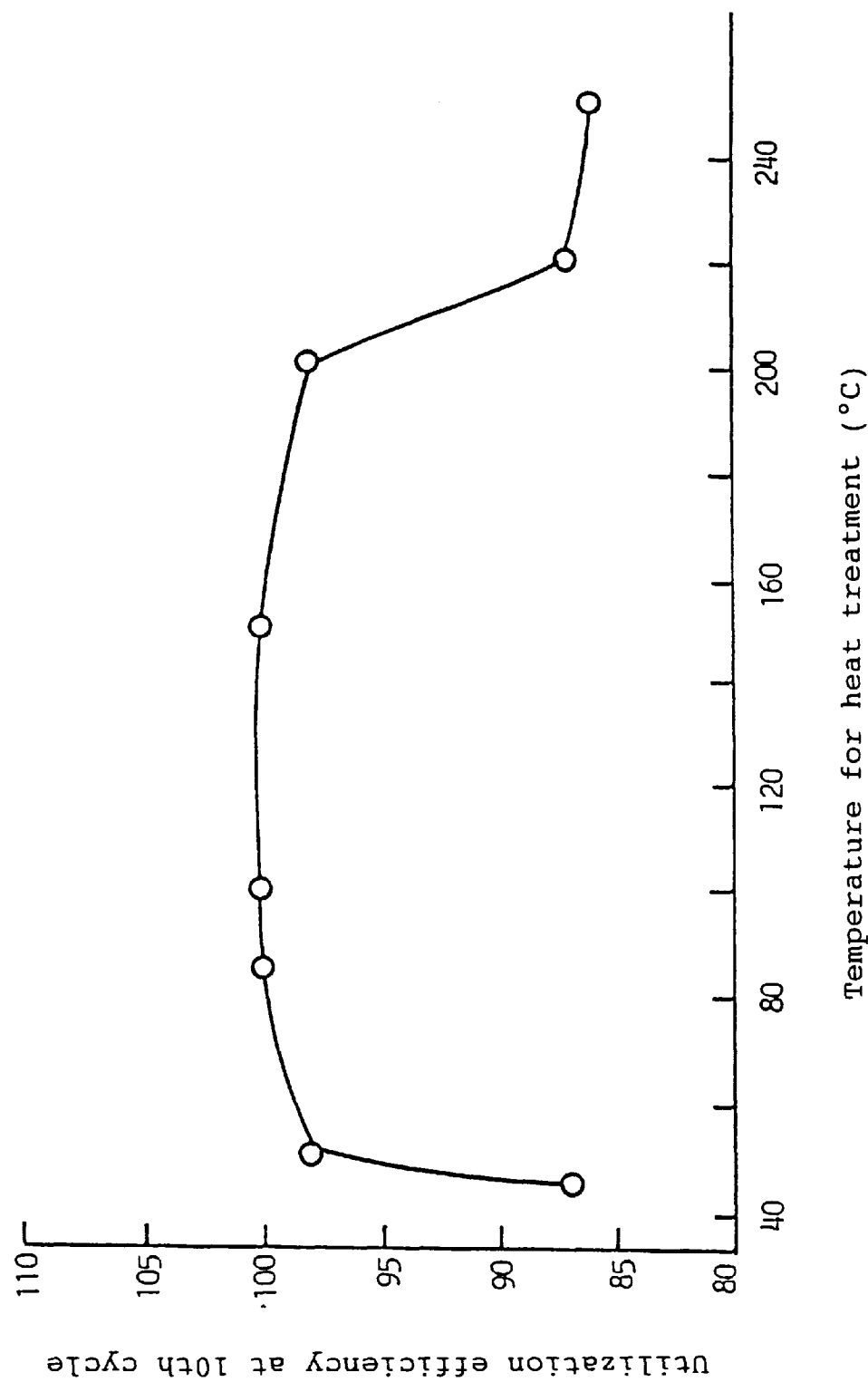
FIG. 2 is a diagrammatic representation of the relationship of the temperature for heat treatment with the utilization efficiency at the 10th cycle.

Each of the above batteries was subjected to a cycle test under the same conditions as mentioned hereinbefore and the active material utilization efficiency values of the electrodes used in the respective batteries at the 10th cycle were determined. The results are shown in FIG. 2. FIG. 2 is a diagrammatic representation of the relationship of the temperature (° C.) for heat treatment as plotted on the abscissa with the utilization efficiency at the 10th cycle as plotted on the ordinate. FIG. 2 also shows the utilization efficiency of electrode a1 of the invention (temperature for heat treatment: 85° C.) at the 10th cycle and the utilization efficiency values plotted on the ordinate are relative values with the utilization efficiency of electrode a1 of the invention being taken as 100.

It is clear from FIG. 2 that in order to provide a non-sintered nickel electrode with a high utilization efficiency, the heat treatment is preferably conducted at a temperature of 50–200° C.

Relationship of the Level of Addition of Powdery Yttrium Metal or a Powdery Yttrium Compound With the Utilization Efficiency and Capacity of the Electrode Except that the proportion of diyttrium trioxide for each 100 parts by weight of the finely divided active material was set at 0.03 part by weight, 0.05 part by weight, 0.1 part by weight, 1, part by weight, 5 parts by weight, 7 parts by weight, or 10 parts by weight in Step 3 of Example 1, the procedure of Example 1 was otherwise repeated to fabricate non-sintered nickel electrodes and alkaline storage batteries.

(1) Relationship of the level of addition of powdery yttrium metal or a powdery yttrium compound with the utilization rate of the electrode.

Each of the above batteries was subjected to a cycle test under the same conditions as mentioned hereinbefore and the utilization efficiency values of the non-sintered nickel electrodes used in the respective batteries at the 10th and 200th cycles were determined. The results are shown in Table 2. Table 2 also shows the utilization efficiency values of electrode a1 of the invention (amount of diyttrium trioxide: 3 parts by weight) at the 10th and 200th cycles and the utilization efficiency values in Table 2 are relative values with the utilization efficiency of electrode a1 of the invention being taken as 100.

TABLE 2

| Level of addition of $Y_2O_3$ to active material powder (parts by weight) | Utilization efficiency at 10th cycle | Utilization efficiency at 200th cycle |
| --- | --- | --- |
| 0.03 | 100 | 87 |
| 0.05 | 100 | 96 |
| 0.1 | 100 | 96 |
| 1 | 100 | 97 |
| 3 | 100 | 97 |
| 5 | 100 | 97 |
| 7 | 100 | 96 |
| 10 | 100 | 96 |

It can be seen from Table 2 that in order to provide a non-sintered nickel electrode with a high utilization efficiency, the level of addition of diyttrium trioxide relative to each 100 parts by weight of particulate active material is preferably not less than 0.05 part by weight.

Figure 3:
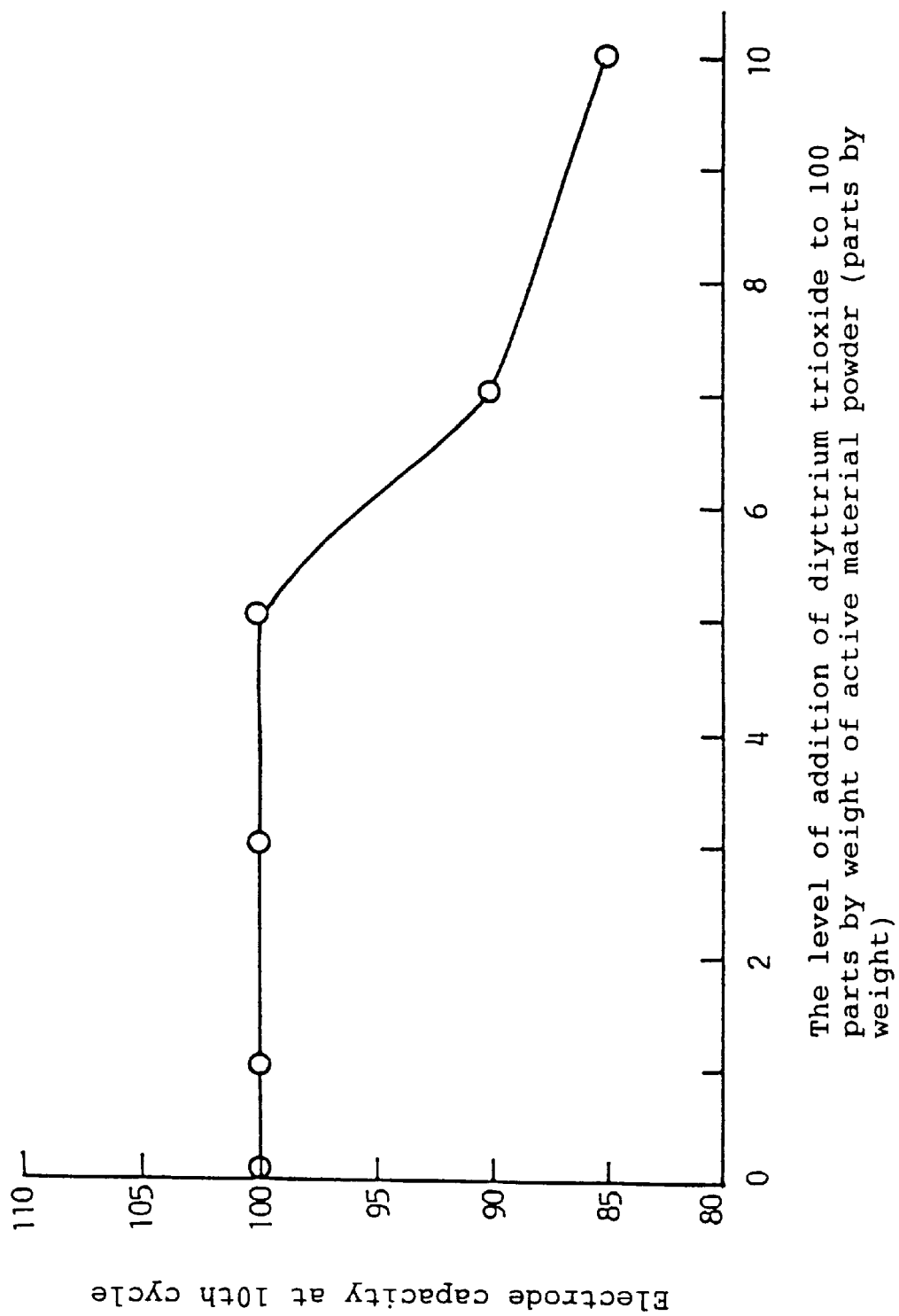
FIG. 3 is a diagrammatic representation of the relationship of the level of addition of diyttrium trioxide with the electrode capacity at the 10th cycle.

(2) Relationship of the level of addition of powdery yttrium metal or a powdery yttrium compound with the capacity of the electrode Each of the batteries assembled as above was subjected to a cycle test under the same charge-discharge conditions as mentioned hereinbefore and the electrode capacities of the non-sintered nickel electrodes used in the respective batteries at the 10th cycle were determined. The results are shown in FIG. 3. FIG. 3 is a diagrammatic representation of the relationship of the proportion of diyttrium trioxide (in parts by weight for each 100 parts by weight of the active material powder) as plotted on the abscissa with the electrode capacity at the 10th cycle as plotted on the ordinate. FIG. 3 also shows the 10th cycle capacity of electrode a1 of the invention (the proportion of diyttrium trioxide: 3 parts by weight) and the electrode capacity values on the ordinate are relative values with the capacity of electrode a1 of the invention being taken as 100.

It will be clear from FIG. 3 that in order to provide a non-sintered nickel electrode with a large electrode capacity, the level of addition of diyttrium trioxide is preferably not over 5 parts by weight for each 100 parts by weight of the particulate active material.

It can be understood from the results of analyses under (1) and (2) above that the level of addition of diyttrium trioxide to each 100 parts by weight of finely divided active material is preferably within the range of 0.05–5 parts by weight.

Preliminary Experiment 3

Powdery cobalt hydroxide was mixed with a 25 wt. % aqueous solution of sodium hydroxide in a weight ratio of 1:10 and the mixture was heat-treated at 80° C. for 8 hours, then rinsed with water, and dried at 60° C. to provide a sodium-doped cobalt compound. The sodium content of this sodium-doped cobalt compound was 1 wt. % as determined by atomic absorption analysis.

EXAMPLE 5

Fabrication of the Positive Electrode

To 1000 ml of an aqueous solution prepared by dissolving 13.1 g of powdery cobalt sulfate was added 100 g of powdery nickel hydroxide, followed by dropwise addition of 1 mol/liter aqueous sodium hydroxide solution with stirring to adjust the system to pH 11, and the mixture was further stirred for 1 hour. During this period, the pH of the system was monitored with a glass electrode (pH meter) equipped with an automatic temperature compensator and, when necessary, an additional amount of aqueous sodium hydroxide solution was added dropwise so as to maintain the system at pH 11 at all times.

The resulting precipitate was recovered by filtration, rinsed with water, and dried in vacuo at room temperature (about 25° C.) to provide a powder comprising composite particles each consisting of a nickel hydroxide core and a cobalt hydroxide shell layer.

Then, the above powder comprising composite particles was mixed with a 25 wt. % aqueous solution of sodium hydroxide in a weight ratio of 1:10 and the mixture was heat-treated in the air at 80° C. for 8 hours. The heat-treated mixture was rinsed with water and dried at 65° C. to provide a particulate active material comprising composite particles each consisting of a nickel hydroxide core and a sodium-doped cobalt compound shell layer. The proportion of the shell layer relative to nickel hydroxide as determined by atomic absorption analysis was 5 wt. % as cobalt. As estimated from the results of Preliminary Experiment 3, the sodium content of this shell layer is 1 wt. %.

A paste was prepared by kneading 100 parts by weight of the above particulate active material (mean particle diameter 10 μm), 3 parts by weight of powdery diyttrium trioxide ($Y_2O_3$) with a mean particle diameter of 1 μm, and as a binder, 20 parts by weight of a 1 wt. % aqueous solution of methylcellulose and this paste was used to impregnate a foamed nickel (porosity 95%; mean pore diameter 200 μm) and the impregnated foamed nickel was dried and compression molded to provide a non-sintered nickel electrode (electrode of the invention: sized 70 mm long by 40 mm wide by 0.70 mm thick)×1.

Assembly of the Battery

Using the above positive electrode, the known paste-type cadmium electrode having an electrochemical capacity of 1.5 times that of the positive electrode (negative electrode sized 85 mm long by 40 mm wide by 0.35 mm thick), a polyamide nonwoven fabric (separator), a 30 wt. % aqueous solution of potassium hydroxide (alkaline electrolyte), a metallic case, and a metallic lid, an AA size nickel-cadmium storage battery X1 was fabricated.

COMPARATIVE EXAMPLE 7

Except that the addition of powdery diyttrium trioxide to the powdery active material was omitted, the procedure of Example 5 was otherwise repeated to provide a non-sintered nickel electrode (comparative electrode) y1, and using this electrode, a nickel-cadmium storage battery Y1 was fabricated.

COMPARATIVE EXAMPLE 8

A paste was prepared by kneading 100 parts by weight of a nickel hydroxide active material powder (mean particle diameter 10 μm), 7 parts by weight of powdery cobalt, 5 parts by weight of powdery cobalt hydroxide, 1 part by weight of powdery diyttrium trioxide with a mean particle diameter of 1 μm, and as a binder, 20 parts by weight of a 1 wt. % aqueous solution of methylcellulose and this paste was used to impregnate a foamed nickel (porosity 95%, mean pore diameter 200 μm). The impregnated foamed nickel was dried and compression molded to provide a non-sintered nickel electrode (comparative electrode) y2. Then, except that this non-sintered nickel electrode was used as the positive electrode, the procedure of Example 5 was otherwise repeated to fabricate a nickel-cadmium storage battery $Y_2$.

Utilization Efficiency of the Battery

Each of the above nickel-cadmium storage batteries X1, Y1, and $Y_2$ was subjected to a cycle test comprising charging to 160% at 25° C. and 0.1° C. and discharging to 1.0 V at 25° C. and 1° C. as one cycle and the utilization efficiency at the 10th cycle was determined. Then, each battery was charged to 160% at 60° C. and 0.1° C. and discharged to 1.0 V at 25° C. and 1° C. and the utilization efficiency was determined. The active material utilization efficiency was calculated by means of the formula presented below. The results are shown in Table 3. The utilization efficiency values in Table 3 are relative values with the 10th cycle utilization efficiency of nickel-cadmium storage battery X1 at 1° C. and 25° C. being taken as 100. Utilization efficiency (%)= {discharge capacity (mAh)/[amount of nickel hydroxide (g)×288 (mAh/g)]}×100

TABLE 3

| Cell | Utilization efficiency at a charge temperature of 25° C. | Utilization efficiency at a charge temperature of 60° C. |
| --- | --- | --- |
| X1 | 100 | 70 |
| Y1 | 100 | 60 |
| Y2 | 75 | 30 |

It is apparent from Table 3 that the nickel-cadmium storage battery X1 fabricated by using electrode x1 of the invention as the positive electrode gave higher utilization efficiency values at both charging temperatures of 25° C. and 60° C. as compared with the nickel-cadmium storage batteries Y1 and Y2 fabricated by using comparative electrodes y1 and y2, respectively. The low utilization efficiency of the nickel-cadmium storage battery Y1 fabricated using the electrode without addition of diyttrium trioxide to the active material powder at a charging temperature of 60° C. is attributable to the fact that because of the low oxygen overpotential of the positive electrode, much of the charging current energy is wasted in the oxygen generating reaction. On the other hand, the relatively low utilization efficiency of nickel-cadmium storage battery Y2 at a charging temperature of 25° C. as compared with the utilization efficiency of nickel-cadmium storage battery X1 at the same charging temperature of 25° C. is attributable to the fact that the electric conductivity-imparting effect of addition of cobalt metal and cobalt hydroxide powders is antagonized by the powdery diyttrium trioxide added for increasing the oxygen overpotential so that the formation of a uniform conductive matrix on the surface of the nickel hydroxide particle was inhibited. In the case of nickel-cadmium storage battery X1 wherein powdery diyttrium trioxide had been added to the active material particles each comprising a nickel hydroxide core and an electrically conductive shell layer, the electrical conductivity was not sacrificed by the diyttrium trioxide added.

Figure 4:
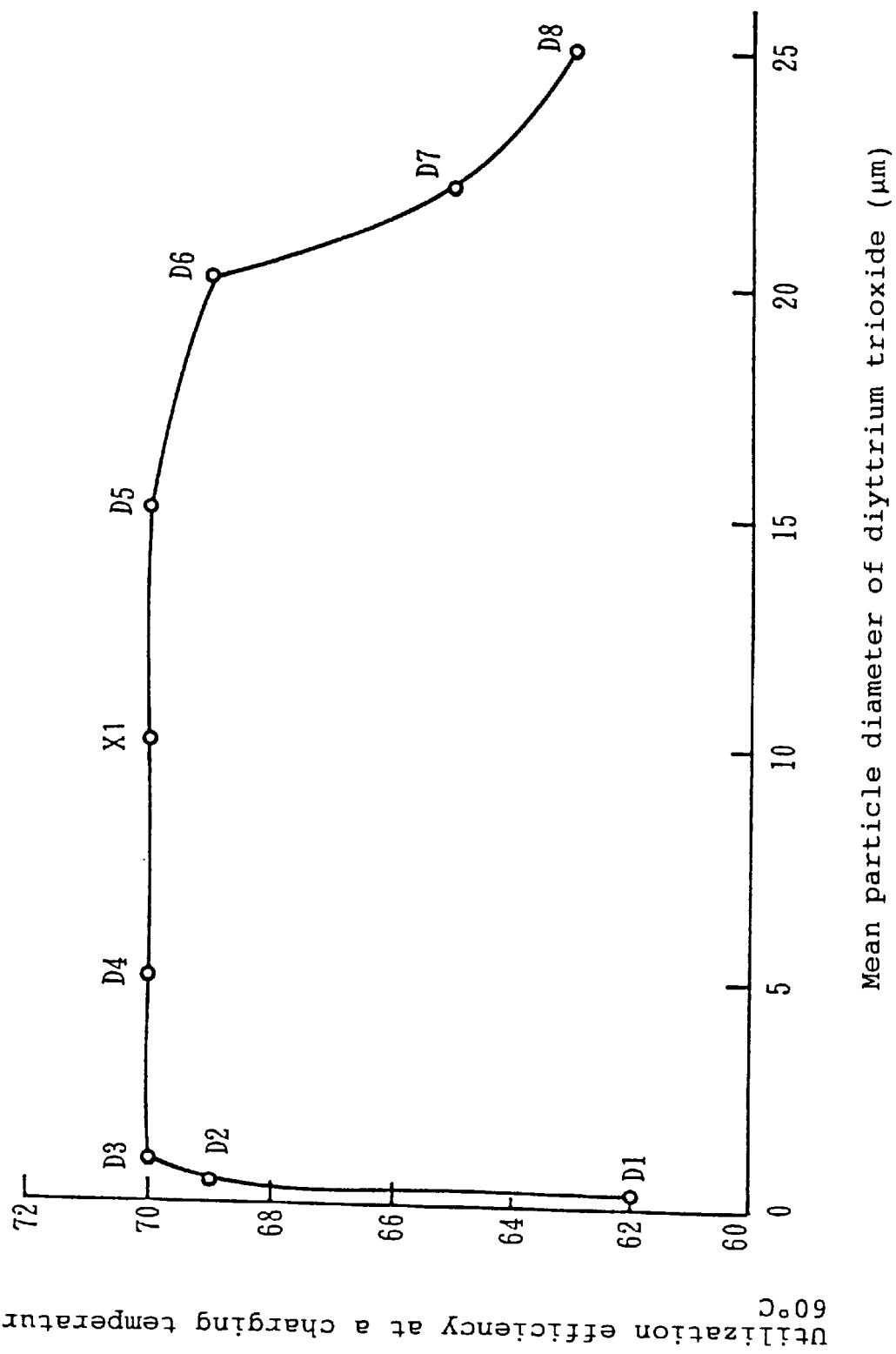
FIG. 4 is a diagrammatic representation of the relationship of the mean particle diameter of powdery diyttrium trioxide with the utilization efficiency at a charging temperature of 60° C.

Relationship of the Mean Particle Diameter of Powdery Diyttrium Trioxide Added With Utilization Efficiency Except that diyttrium trioxide powders with mean particle diameters of 0.3 μm, 0.5 μm, 1.0 μm, 5.0 μm, 10.0 μm, 15.0 μm, 20.0 μm, 22.0 μm, or 25.0 μm, respectively, were added to the finely divided active material in the stage of fabrication of positive electrodes, the procedure of Example 5 was otherwise repeated to fabricate nickel-cadmium storage batteries D1–D8, respectively. Then, the 10th cycle utilization efficiency of each-battery at a charging temperature of 60° C. was determined by the same method as described hereinbefore. The results are shown in FIG. 4. FIG. 4 also shows the data for nickel-cadmium storage battery X1. FIG. 4 is a diagrammatic representation of the relationship of the mean particle diameter (μm) of powdery diyttrium trioxide as plotted on the abscissa with utilization efficiency at a charge temperature of 60° C. as plotted on the ordinate. The utilization efficiency values on the ordinate are relative values with the 10th charge-discharge cycle utilization efficiency of nickel-cadmium storage battery X1 at 25° C. being taken as 100.

It is apparent from FIG. 4 that, at a charging temperature of 60° C., nickel-cadmium storage batteries X1 and D2–D6 obtained by adding diyttrium trioxide with mean particle diameters from 0.5–20.0 μm to the active material powder showed remarkably higher utilization efficiency values than nickel-cadmium storage batteries D1, D7, and D8 which had been obtained by adding diyttrium trioxide powders outside the above mean particle diameter range to the active material powder. This fact indicates that in order to provide a non-sintered nickel electrode with a satisfactory charge characteristic at high temperatures, it is advantageous to add a diyttrium-trioxide powder with a mean particle diameter from 0.5 to 20.0 μm to the active material powder.

Figure 5:
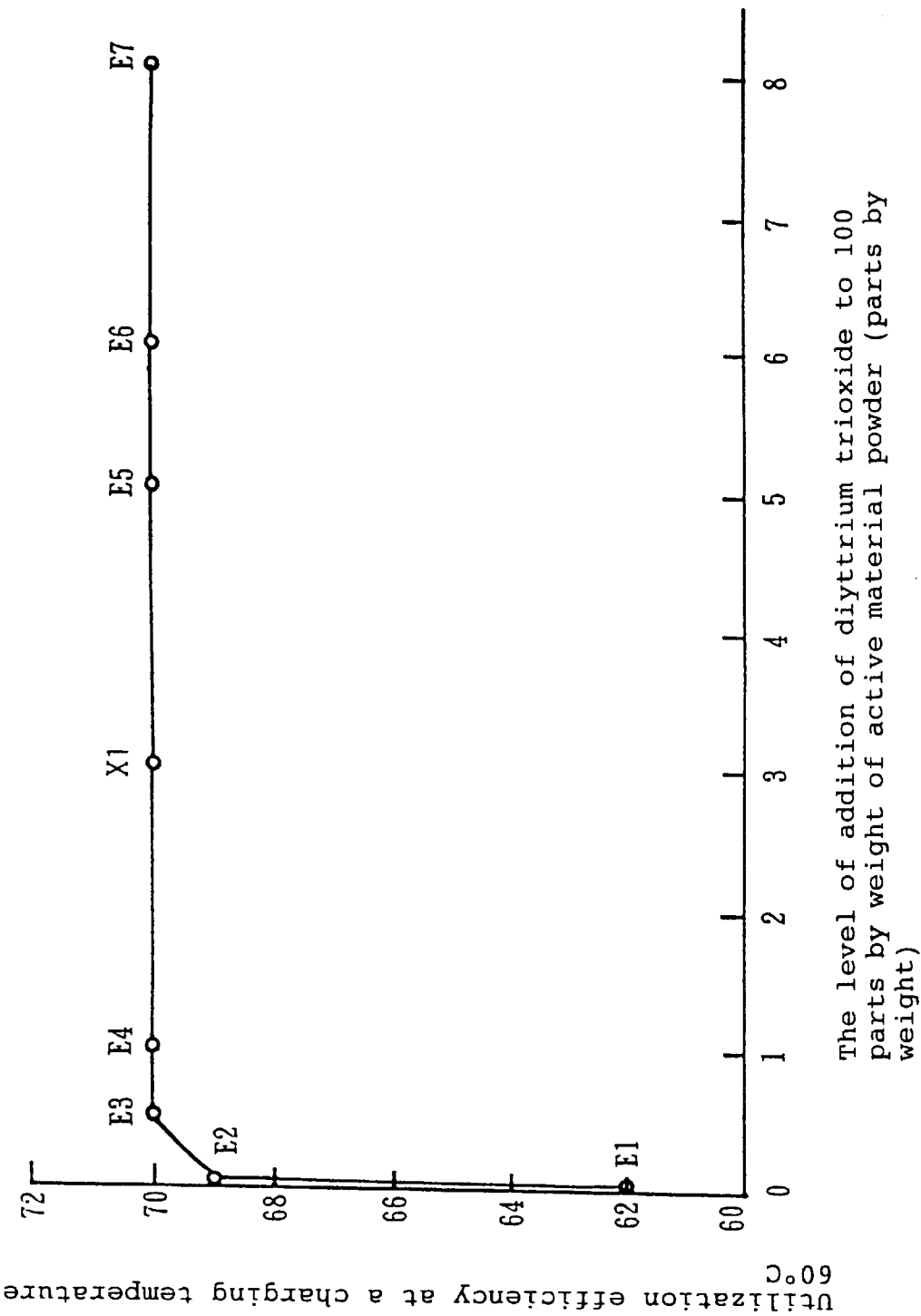
FIG. 5 is a diagrammatic representation of the relationship of the level of addition of powdery diyttrium trioxide with the utilization efficiency at a charging temperature of 60° C.

Relationship of the Level of Addition of Powdery Diyttrium Trioxide With Utilization Efficiency and Electrode Capacity Except that powdery diyttrium trioxide with a mean particle diameter of 1.0 μm was added in the proportions of 0.03 part by weight, 0.05 part by weight, 0.5 part by weight, 1.0 part by weight, 3.0 parts by weight, 5.0 parts by weight, 6.0 parts by weight, and 8.0 parts by weight to each 100 parts by weight of active material powder in the stage of fabrication of positive electrodes, the procedure of Example 5 was otherwise repeated to fabricate nickel-cadmium storage batteries E1–E7, respectively. Then, for each of those storage batteries, the 10th cycle utilization efficiency at a charging temperature of 60° C. and the 10th cycle electrode capacity at a charging temperature of 25° C. were determined by the same methods as described hereinbefore. The results are shown in FIG. 5 and FIG. 6, respectively. FIG. 5 is a diagrammatic representation of the relationship of the proportion of powdery diyttrium trioxide relative to active material powder as plotted (parts by weight) on the abscissa with the utilization efficiency at a charging temperature of 60° C. as plotted on the ordinate. FIG. 5 also shows the corresponding result with nickel-cadmium storage battery X1. The utilization efficiency values on the ordinate are relative values with the 10th cycle utilization efficiency of nickel-cadmium storage battery X1 at a charging temperature of 25° C. being taken as 100. FIG. 6 is a diagrammatic representation of the relationship of the proportion (parts by weight) of powdery diyttrium trioxide to each 100 parts by weight of active material powder as plotted on the abscissa with the 10th cycle electrode capacity at a charging temperature of 25° C. as plotted on the ordinate. FIG. 6 also shows the result with nickel-cadmium storage battery X1. The electrode capacity values on the ordinate are relative values with the 10th cycle electrode capacity of nickel-cadmium storage battery X1 at a charging temperature of 25° C. being taken as 100.

It is apparent from FIG. 5 that compared with nickel cadmium storage battery E1 obtained by adding 0.03 part by weight of powdery diyttrium trioxide to active material powder, nickel-cadmium storage batteries X1 and E2–E7 obtained by adding 0.05 part by weight or more of powdery diyttrium trioxide to active material powder showed remarkably higher utilization efficiencies at a charging temperature of 60° C. This fact indicates that in order to provide a non-sintered nickel electrode with a satisfactory charge characteristic at high temperatures, it is advantageous to add powdery diyttrium trioxide in a proportion of not less than 0.05 part by weight to each 100 parts by weight of active material powder.

However, it can be seen from FIG. 6 that addition of diyttrium trioxide in any proportion beyond 5 parts by weight to active material powder (nickel-cadmium storage batteries E6 and E7) results in a decrease in the 10th cycle electrode capacity at a charging temperature of 25° C. The results presented in FIGS. 5 and 6 being taken together, it can be seen that the preferred proportion of powdery diyttrium trioxide to each 100 parts by weight of active material powder is 0.05–5 parts by weight.

Though, in the above examples, a monocomponent powder composed of nickel hydroxide only was used as the nickel hydroxide powder, it has been confirmed that results more or less as satisfactory as the results described above can be obtained by using solid solution powders in which at least one element selected from the group consisting of cobalt, zinc, cadmium, calcium, manganese, magnesium, bismuth, aluminum, and yttrium has been dissolved in nickel hydroxide.

EFFECT OF THE INVENTION

In accordance with the present invention, there is provided a non-sintered nickel electrode and an alkaline storage battery which are capable of exhibiting a high utilization efficiency not only in an initial phase of charge-discharge cycling but also over a long time. Particularly by using a yttrium metal powder and/or a yttrium compound powder within a defined range of mean particle diameter, there can be provided a non-sintered nickel electrode for an alkaline storage battery and an alkaline storage battery which exhibit a high utilization efficiency not only in an initial phase of charge-discharge cycling but also over a long time and have very satisfactory charge characteristics particularly at high temperatures.

What is claimed is:

1. A non-sintered nickel electrode for an alkaline storage battery which comprises a particulate active material comprising composite particles each consisting of a nickel hydroxide core and a sodium-doped cobalt compound shell and a particulate yttrium metal and/or yttrium compound as added to said particulate active material.

2. The non-sintered nickel electrode for an alkaline storage battery as claimed in claim 1 wherein said nickel hydroxide core is a particulate solid solution comprising nickel hydroxide and, as dissolved therein, at least one element selected from the group consisting of cobalt, zinc, cadmium, calcium, manganese, magnesium, bismuth, aluminum and yttrium.

3. The non-sintered nickel electrode for an alkaline storage battery as claimed in claim 1 wherein said sodium-doped cobalt compound is sodium-doped cobalt hydroxide or sodium-doped cobalt oxyhydroxide, or a mixture thereof.

4. The non-sintered nickel electrode for an alkaline storage battery as claimed in claim 1 wherein said particulate yttrium compound is a powder of diyttrium trioxide, yttrium carbonate, or yttrium fluoride.

5. The non-sintered nickel electrode for an alkaline storage battery as claimed in claim 1 wherein said shell is a surface layer formed by adding an aqueous solution of sodium hydroxide to composite particles each consisting of a nickel hydroxide core and a cobalt metal or cobalt compound shell layer to produce a mixture and heat-treating the mixture in the presence of oxygen at a temperature of 50–200° C.

6. The non-sintered nickel electrode for an alkaline storage battery as claimed in claim 5, wherein said cobalt compound shell is a layer of cobalt hydroxide, cobalt monoxide, or cobalt oxyhydroxide.

7. The non-sintered nickel electrode for an alkaline storage battery as claimed in claim 1 wherein the proportion of said sodium-doped cobalt compound shell, in terms of cobalt metal, is 1–10 weight % based on said nickel hydroxide core.

8. The non-sintered nickel electrode for an alkaline storage battery as claimed in claim 1 wherein said sodium-doped cobalt compound contains 0.1–10 weight % of sodium.

9. The non-sintered nickel electrode for an alkaline storage battery as claimed in claim 1 wherein the level of addition of said particulate yttrium metal and/or yttrium compound is 0.05–5 parts by weight for each 100 parts by weight of said particulate active material.

10. The non-sintered nickel electrode for an alkaline storage battery as claimed in claim 1 wherein the mean particle diameter of said particulate yttrium metal and/or yttrium compound is 0.5–20 μm.

11. The non-sintered nickel electrode for an alkaline storage battery as claimed in claim 1, including an electrically conductive substrate.

12. The non-sintered nickel electrode for an alkaline storage battery as claimed in claim 11 wherein said electrically conductive substrate is a foamed nickel, a felt-like porous element of metal fiber, or a perforated metal.

13. A method of manufacturing a non-sintered nickel electrode for an alkaline storage battery which comprises adding an aqueous solution of sodium hydroxide to a powder comprising composite particles each consisting of a nickel hydroxide core and either a cobalt metal shell layer or a cobalt compound shell layer to produce a mixture, heating the mixture in the presence of oxygen at a temperature of 50–200° C. to provide a particulate active material comprising a nickel hydroxide particle having a sodium-doped cobalt compound shell layer, dispersing said particulate active material and a particulate yttrium metal and/or yttrium compound in a dispersion medium to provide a paste, coating an electrically conductive substrate with said paste, and drying the coated substrate.

14. The method of manufacturing a non-sintered nickel electrode for an alkaline storage battery as claimed in claim 13 wherein said cobalt metal shell layer is a surface layer formed by dry-mixing particles of nickel hydroxide and particles of cobalt metal in an inert gas.

15. The method of manufacturing a non-sintered nickel electrode for an alkaline storage battery as claimed in claim 13 wherein said cobalt compound shell layer is a cobalt hydroxide layer formed by adding particulate nickel hydroxide to an aqueous solution of a salt of cobalt and adding an alkaline aqueous solution dropwise thereto with constant stirring to cause cobalt hydroxide to be precipitated on the surface of nickel hydroxide particles.

16. The method of manufacturing a non-sintered nickel electrode for an alkaline storage battery as claimed in claim 13 wherein said cobalt compound shell layer is a cobalt hydroxide layer formed by dry-mixing particulate nickel hydroxide and particulate cobalt hydroxide in an inert gas.

17. The method of manufacturing a non-sintered nickel electrode for an alkaline storage battery as claimed in claim 13 wherein said cobalt compound shell layer is a surface layer formed by dry-mixing particulate nickel hydroxide and particulate cobalt monoxide in an inert gas.

18. The method of manufacturing a non-sintered nickel electrode for an alkaline storage battery as claimed in claim 13 wherein said cobalt compound shell layer is a cobalt oxyhydroxide layer formed by disposing a cobalt hydroxide layer on the surface of particulate nickel hydroxide and oxidizing the cobalt hydroxide layer.

19. An alkaline storage battery including a non-sintered nickel electrode for an alkaline storage battery, wherein said non-sintered electrode for an alkaline battery comprises a particulate active material comprising composite particles each consisting of a nickel hydroxide core and a sodium-doped cobalt compound shell and a particulate yttrium metal and/or yttrium compound as added to said particulate active material.

20. The alkaline storage battery of claim 19 wherein said nickel hydroxide core is a particulate solid solution comprising nickel hydroxide and, as dissolved therein, at least one element selected from the group consisting of cobalt, zinc, cadmium, calcium, manganese, magnesium, bismuth, aluminum and yttrium.

21. The alkaline storage battery of claim 19 wherein said sodium-doped cobalt compound is sodium-doped cobalt hydroxide or sodium-doped cobalt oxyhydroxide, or a mixture thereof.

22. The alkaline storage battery of claim 19, wherein said particulate yttrium compound is a powder of diyttrium trioxide, yttrium carbonate, or yttrium fluoride.

23. The alkaline storage battery of claim 19, wherein said shell is a surface layer formed by adding an aqueous solution of sodium hydroxide to composite particles each consisting of a nickel hydroxide core and a cobalt metal or cobalt compound shell layer to produce a mixture and heat-treating the mixture in the presence of oxygen at a temperature of 50–200° C.

24. The alkaline storage battery of claim 23, wherein said cobalt compound shell is a layer of cobalt hydroxide, cobalt monoxide, or cobalt oxyhydroxide.

25. The alkaline storage battery of claim 19, wherein the proportion of said sodium-doped cobalt compound shell, in terms of cobalt metal, is 1–10 weight % based on said nickel hydroxide core.

26. The alkaline storage battery of claim 19 wherein said sodium-doped cobalt compound contains 0.1–10 weight % of sodium.

27. The alkaline storage battery of claim 19, wherein the level of addition of said particulate yttrium metal and/or yttrium compound is 0.05–5 parts by weight for each 100 parts by weight of said particular active material.

28. The alkaline storage battery of claim 19, wherein the mean particle diameter of said particulate yttrium metal and/or yttrium compound is 0.5–20 $\mu$m.

29. The alkaline storage battery of claim 19, further including an electrically conductive substrate.

30. The alkaline storage battery of claim 19, wherein said electrically conductive substrate is a foamed nickel, a felt-like porous element of metal fiber, or a perforated metal.

31. The alkaline storage battery of claim 19, further including a hydrogen-absorbing alloy electrode, a cadmium electrode or a zinc electrode as the negative electrode.

* * * * *